United States Patent [19]

Sorin

[11] Patent Number: 4,986,623
[45] Date of Patent: Jan. 22, 1991

[54] BROADBAND TUNABLE IN-LINE FILTER FOR FIBER OPTICS

[75] Inventor: Wayne V. Sorin, Mountain View, Calif.

[73] Assignee: Hewlett-Packard Company, Palo Alto, Calif.

[21] Appl. No.: 355,144

[22] Filed: May 15, 1989

Related U.S. Application Data

[63] Continuation of Ser. No. 4,997, Jan. 20, 1987, abandoned.

[51] Int. Cl.$^5$ .......................... G02B 6/26; G02B 6/34
[52] U.S. Cl. .......................... 350/96.15; 350/96.19; 350/162.17; 350/162.2; 350/162.24
[58] Field of Search ............... 350/96.15, 96.16, 96.19, 350/162.17, 162.20, 162.24

[56] References Cited

U.S. PATENT DOCUMENTS

| | | | |
|---|---|---|---|
| 3,794,408 | 2/1974 | Ian et al. | 350/162.17 |
| 4,102,560 | 7/1978 | Miller | 350/96.19 |
| 4,111,524 | 9/1978 | Tomlinson, III | 350/96.19 |
| 4,268,116 | 5/1981 | Schmadel et al. | 350/96.29 |
| 4,622,663 | 11/1986 | Ishikawa et al. | 370/3 |

FOREIGN PATENT DOCUMENTS

2161609A 1/1986 United Kingdom ............. 350/96.19

OTHER PUBLICATIONS

Bulmer et al., IEEE J. of Quantum Electronics, vol. QE-14, No. 10, Oct. 1978, "Single Mode Grating Coupling Between Thin-Film and Fiber Optical Waveguides," pp. 741-749.
"Tunable Fibre-Extended-Cavity Laser", *Electronic Letters*, 3/26/87; vol. 23, No. 7.
"Wavelength-Tunable Single-Mode Fibre Grating Reflector", *Electronic Letters*, 11/20/86, vol. 22, No. 24.

*Primary Examiner*—Frank Gonzalez

[57] ABSTRACT

A broadband tunable in-fiber filter includes a grating with divergent ridges which can be translated transversely of a side-polished optical fiber to vary the periodicity at an exposed evanescent field. The divergence is gradual so that at any given transverse position of the grating, the ridge interacting with the evanescent field are effectively parallel. The divergence is great enough so that a tuning-to-reflected bandwidth ratio of about 33:1 is demonstrated. The grating is fabricated in an amorphous silicon film on a fused quartz substrate. The film is coated with photoresist which is exposed to a holographic interference front. The substrate is tilted with respect to an interference front created by two spherically diverging beams to achieve the desired divergence. Subsequent processing, including etching are standard.

16 Claims, 9 Drawing Sheets

BROADBAND TUNABLE IN-LINE FILTER FOR FIBER OPTICS

Cross Reference to Related application, this application is a continuation-in-part of application Ser. No. 004,997, filed Jan. 20, 1987, now abandoned.

BACKGROUND OF THE INVENTION

The present invention relates to fiber optics, and, more particularly, to filters for fiber optic systems.

Filters for selecting a narrow frequency band from a relatively broad band of transmitted electro-magnetic radiation, "light" herein, have many diverse applications. For example, such filters can be used to provide narrower bands of light than might be otherwise available from a laser or other source. In one application, light so filtered can be reflected back to a laser source to tune the laser to a desired band.

Fiber optic filters can also be used to improve signal-to-noise ratios by isolating a signal carrying band from adjacent frequency bands. Also, selective filters can be used to demultiplex wavelength division multiplexed (WLDM) optical signals. A diverse array of other uses can be recognized by analogy to electronic systems.

Until recently, filters for fiber optics used bulk optic approaches in which light was removed from an optical fiber to be filtered externally. The filtered light could then be reintroduced into a fiber for subsequent transmission.

One disadvantage of the bulk optic approaches is the bulk of the external filter and required couplers. Another disadvantage relates to the necessarily tight mechanical tolerances and resultant vulnerability to vibration and environmental changes. The complexities and losses involved in the bulk optic approaches have inspired a search for an effective way to filter light "in-line", i.e., without removing it from the fiber. Devices which function by interacting directly with the evanescent fields of guided light in a single mode fiber are thus of considerable interest as elegant and compact alternatives to bulk optic devices.

An approach to "in-fiber" filtering, applicable to single-mode fibers is disclosed by W. V. Sorin and H.J. Shaw in "A Single-Mode Fiber Evanescent Grating Reflector", Journal of Lightwave Technology, Vol. LT-3, No. 5, Oct. 1985, pp. 1041-1042. This article disclosed the use of a metal diffraction grating disposed upon the side-polished portion of an optical fiber. This arrangement provides narrow band reflections of light transmitted from a laser source.

The evanescent trailing fields in the neighborhood of the fiber core can be reached using a well-known technique in which the fiber is stripped of its coating, embedded with epoxy in a groove cut in a glass block, ground down to the vicinity of its core and highly polished. This technique is described in a disclosure by R.A. Bergh, G. Kotler, and H.J Shaw, entitled "Single-Mode Fibre Optic Directional Coupler", Electronics Letters, Vol. 16, No. 7, Mar. 27, 1980, pp. 260-261. Interaction between the diffraction grating and the evanescent field is obtained by placing the metal surface of the grating in contact with the polished portion of the fiber. An index oil can be applied between fiber and grating to remove air gaps which would otherwise decrease the extent of the evanescent field.

Herein, a fiber prepared according to the above technique is referred to as a "side-polished fiber". The region so-polished is referred to as the "side-polished region" of the fiber.

The grating used by Sorin and Shaw includes a series of parallel ridges periodically disposed on a pitch of 0.278 microns ($\mu$m). The grating for such a filter can be fabricated using well-known holographic techniques. The interference front generated by an intersecting pair of collimated laser beams can produce a series of generally parallel interference lines. These lines can be used to expose a photoresist coated substrate. The exposed substrate can be processed so that the interference pattern is represented as ridges on the finished grating.

While subsequent analysis has shown that many of the advantages sought from in-fiber filters are obtained by the device disclosed by Sorin and Shaw, it compares unfavorably with external filters in one important respect: heretofore, broadband tunable in-fiber filters have not been available. In contrast, external filters using bulk optical elements have been provided which are tunable over a broad band. Herein, "broad band" and "broadband" are used to refer to tuning ranges which are large relative to the bandwidth being tuned.

In one bulk optic reflective filter approaCh, light is removed from an optical fiber and collimated using an optical lens. The collimated light is then directed against a bulk optic diffraction grating. The diffraction grating diffracts the incident light so as to reflect a narrow band of wavelengths back along the direction of the incoming collimated beam. The reflected band is then coupled back into the fiber.

In this bulk optic approach, tuning is achieved by tilting the bulk optic grating, thereby changing the wavelength back towards the fiber. Rotating the grating changes its effective spatial periodicity in the direction of the incident light. The spatial periodicity determines the frequency band which is superimposed constructively back along the vector of incidence.

As indicated above, such bulk optic approaches are disadvantageous in requiring stringent mechanical tolerances since light must be coupled back into the fiber whose mode diameter can be less than 10 $\mu$m. Furthermore, considerable space is required for the arrangement of the bulk optic components. Accordingly, tunable in-line filters are desired.

Heretofore, the tunability of in-line fiber optic filters has been very limited. The filter disclosed by Sorin and Shaw can be tuned by rotating the grating relative to the fiber. This increases the spatial periodicity of the grating in the direction of the fiber. However, as the grating is rotated, the orthogonality of the ridges to the direction of propagation is diminished so that the quality of the reflected signal is impaired. Thus, the tuning range is practically limit ⓔd to a bandwidth comparable to the bandwidth of the reflected signal.

Two other approaches for tuning a grating filter are disclosed by C.A. Park et al., in "Single-Mode Behavior of a Multimode 1.55 $\mu$m Laser with a Fibre Grating External Cavity", Electronics Letters, Vol. 22, No. 21, Oct. 9, 1986, pp. 1132-1133. The spatial periodicity of the grating can be increased by heating. However, the tuning was limited to 13 angstroms (Å) relative to a transmitted wavelength of 15,620 Å. The tuning range was just slightly larger than the reported 10 Å reflection bandwidth. An even weaker tuning effect was achieved by varying the refractive index of oil placed between the cladding and the grating. In addition to the limited tuning ranges provided, a disadvantage of the temperature and oil approaches are the impracticality of varying these parameters, especially over the ranges required to obtain greater than narrow-band tuning.

Thus, the tuning range of disclosed in-line fiber optic filters has been limited to less than twice the reflection band of the filter of interest. However, in many applications a tuning range at least an order of magnitude greater than the reflection bandwidth is desired.

The quest for a broadband tunable in-line fiber optic filter faces two major challenges. The first is the determination of a structure that can provide the desired tuning function. The second is determining a method of manufacturing a device with the required structure, given the dimensions and precision required in fiber optical systems. Both these challenges are met as described below.

SUMMARY OF THE INVENTION

The present invention provides for an in-line fiber optic fiber filter incorporating a movable grating in which pitch varies as a function of position. By moving the grating relative to the side-polished region of an optical fiber, the evanescent field of light being transmitted along the fiber optic core can interact with different regions of the grating characterized by different pitches. The selected pitch determines the frequency band of the light reflected along the fiber.

In a preferred embodiment of the present invention, the grating includes diverging ridges. The divergence is gradual enough so that the ridges are substantially parallel to the extent they extend transversely over the side-polished region of an optical fiber. More specifically, substantial parallelism applies to ridge segments defined by a half-power interaction region defined by an intersection of an evanescent field with the plane of the grating. On the other hand, the product of the divergence and the transverse extent of the grating is great enough so that the pitch at the side-polished region can be varied to produce a significant change in reflected frequency.

The grating for the filter can be manufactured using a modification of techniques used in fabricating gratings with parallel ridges. However, instead of orienting the grating substrate orthogonal to a holographic front generated by collimated beams the substrate is tilted with respect to an interference front generated by spherically diverging beams so that the interference lines at the substrate diverge.

Tests on the preferred filter demonstrate a reflection efficiency of 65% at 13,000 Å. The measured tuning range is 260 Å, which compares favorably with the measured reflected bandwidth of 5.0 to 6.0 Å.

In the preferred embodiment, the tuning range is at least an order of magnitude greater than the reflection bandwidth attainable. Thus, a broadband tunable filter for a fiber optic system is provided without the complexities and losses inherent in removing and coupling the light to take advantage of external filters using bulk optics.

More specifically, in comparison to tunable bulk optic filters, the present invention provides a filter which requires less space, is more mechanically rugged, has more relaxed mechanical tolerances and is optically more efficient. Regarding fiber coupling tolerances, the fiber reflector is more than two orders of magnitude less sensitive to angular misalignment than a comparable bulk optic device. This yields greatly increased stability in the face of vibrations and environmental changes.

Concurrently, the tuning range is much greater than heretofore provided by in-line fiber optic filters. Furthermore, the tuning is accomplished without comprising the orthogonality of the ridges: thus, the quality of the reflected signal is not impaired as it is in the rotated grating approach to in-line filtration. No hydraulics are required, in contrast to approach using oils with different refractive indexes. Furthermore, the side-effects of large temperature changes, used in the thermal expansion approach to tuning, are avoided. Other features and advantages are apparent in view of the detailed description below in conjunction with the following figures.

DESCRIPTION OF THE PREFERRED EMBODIMENTS

Figure 1:
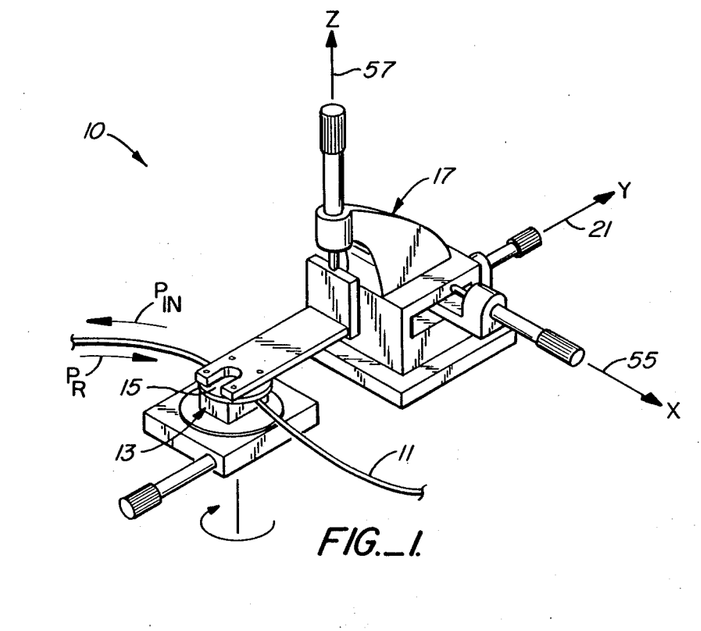
FIG. 1 is a schematic perspective view of a filter for a fiber optic system in accordance with the present invention.
Figure 2:
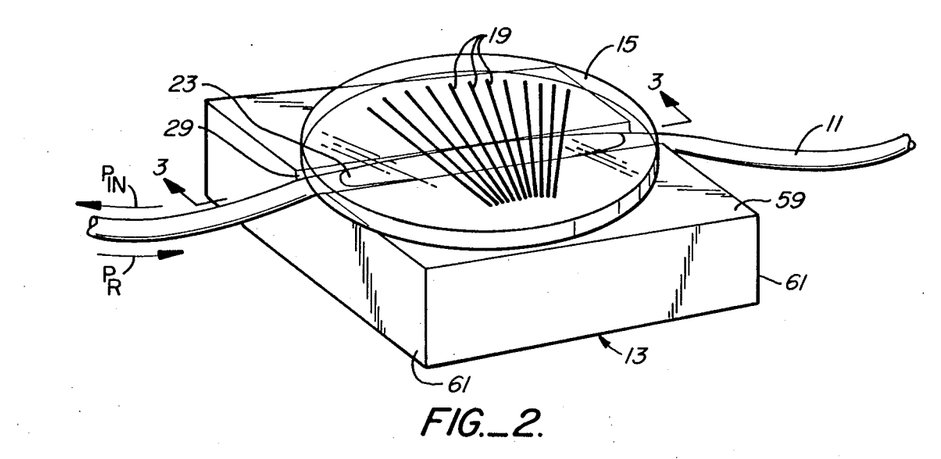
FIG. 2 is a schematic perspective view of a subassembly of the filter of FIG. 1.

In accordance with the present invention, a filter 10 for a fiber optic system is shown comprising a side-polished optical fiber 11, a block 13 for retaining the fiber, a grating 15, and a translation stage 17 for moving the grating relative to the fiber, as shown in FIG. 1. The grating 15 has gradually diverging ridges 19 which extend substantially transversely of the fiber 11, as best shown in FIG. 2. The filter 10 is tuned by operating the Y-control 21 of the translation stage 17 so that the spatial periodicity of the grating 15, i.e., the pitch of the ridges 19 over the side-polished region 23, is changed.

The preferred fiber 11 is a single-mode fiber. Such a fiber provides for precise control of transmitted light since the single propagated mode can be operated on with negligible side-effects due to other propagation modes.

The preferred grating 15 is a first-order grating, i.e., its spatial periodicity is nominally half the wavelength of the mode to be reflected. By using this first-order grating, higher order diffraction modes, which would not be captured by the single-mode fiber 11, are eliminated.

Figure 3:
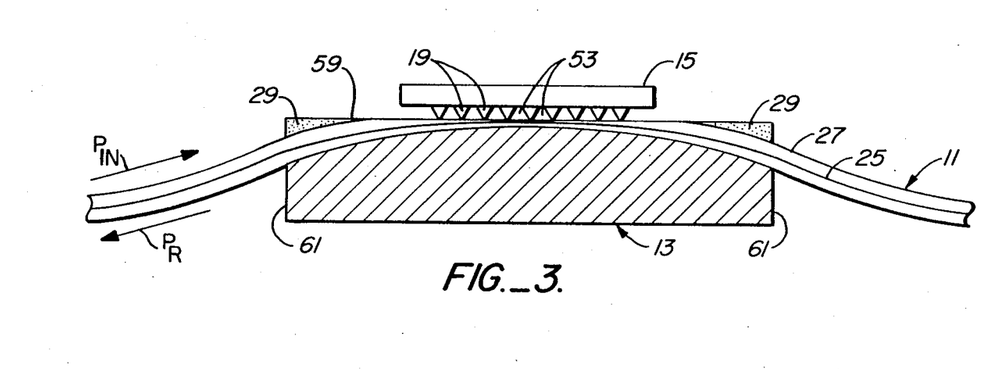
FIG. 3 is a sectional side view of the subassembly of FIG. 2.

The fiber 11 includes a core 25 surrounded by a cladding 27, as shown in FIG. 3. The fiber 11 is shown fixed in position within an arcuate groove 29. At the center of the side-polished region 23, the cladding 27 is thinned insofar as possible without breaching the integrity of the core 25. Preferably, the minimum thickness of the cladding 27 at its side-polished region 23 is less than or at most comparable to the diameter of the core 25.

The purpose of this side-polished region 23 is to permit the evanescent field of incident light $P_{IN}$ being transmitted along the core 25 to protrude from the fiber 11 to interact with the grating 15 to produce a reflection $P_R$. The intersection of such an evanescent field with the surface of the cladding 27 is contained within the side-polished region 23, which thus can be used to roughly locate the exposed evanescent field. Specifically, the region of interaction of the evanescent field with the grating is generally confined to the orthogonal projection of the side-polished region 23 onto the grating 15. Several projection regions A, B, C, D, E and F, corresponding to different transverse positions of the grating 15, are indicated in FIG. 4.

However, a more precise definition for a region of interaction at the grating is available. For a given grating position, at some point on the grating, the evanescent field of light being transmitted along the core achieves maximum strength. A "half-power interaction region" can be defined as that region in the plane of the grating in which the evanescent field is half or more of its maximum. Herein, a region of the grating is said to substantially contain the intersection of the grating and the evanescent field when the region contains the half-power region of the evanescent field defined in the plane of the grating.

This half-power interaction region is much smaller than the side-polished region 23 of the fiber 11. Roughly, the half-power interaction region at the plane of the grating is one-tenth as long and as wide as the side-polished region, so that the area of the half-power interaction region is about one-hundredth that of the side-polished region in the illustrated embodiment In the Bergh et al. reference cited above, the half-power region of a similar half-coupler assembly was found to extend about 2.5 millimeters (mm) along the fiber 11 and between one and two core diameters, or seven $\mu$m, transverse to the fiber 11. This very small transverse extent contributes to the fact that the diverging ridges 19 can be considered parallel for fixed positions of the grating 15, as discussed below.

Figure 4:
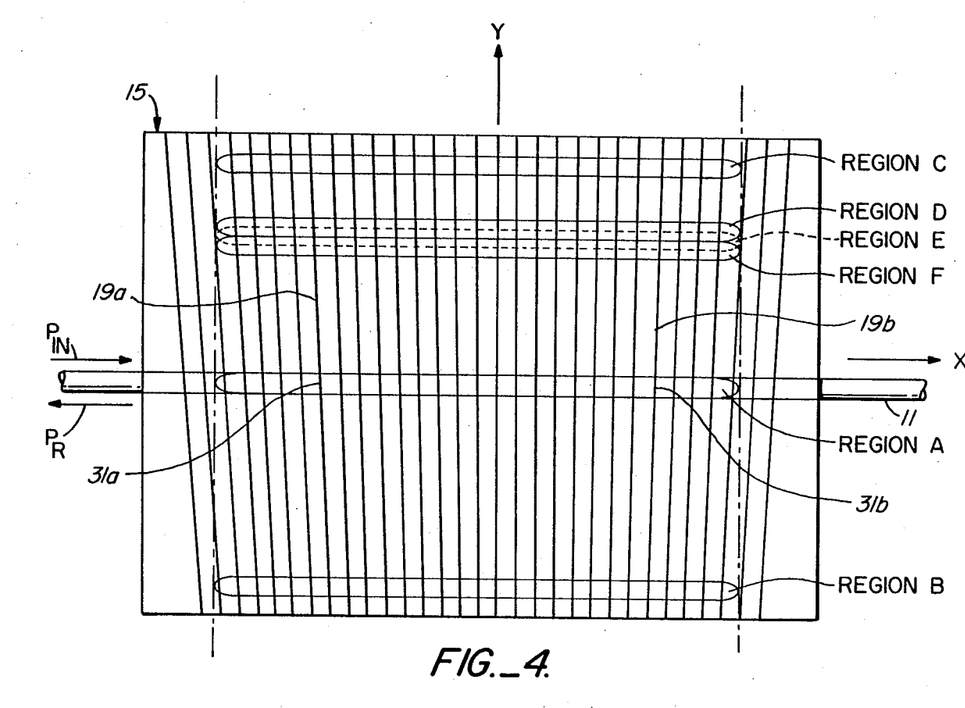
FIG. 4 is a schematic plan view of a grating for the filter of FIG. 1 shown in relation to an optical fiber.

As illustrated in FIG. 4, the grating 15 includes several regions A, B, C, D, E and F. The multiple ridges 19 are shown gradually diverging so that pitch increases as a function of transverse position. Thus, of the illustrated regions, region A has an intermediate pitch, region B has the smallest pitch, and region C has the greatest pitch.

The many regions, including those not separately illustrated, define a continuum extending transversely of the fiber 11 in the Y direction. Thus, regions overlap, as shown in conjunction with regions D, E and F. Thus, by translating the grating 15 in the Y direction and thereby selecting the grating region to be positioned over the half-power interaction region of the fiber, the periodicity experienced by light transmitted along the fiber is changed.

Since the divergence of the ridges 19 is continuous, the tuning function is a monotonic one-to-one mapping of grating position to reflected wavelength. Alternatively, step functions and non-monotonic functions are provided for.

Note that while the ridges 19 are clearly diverging, the segments 31a and 31b of ridges 19a and 19b within region A are very nearly parallel. FIG. 4 is necessarily schematic and cannot do justice to the degree of parallelism. The degree of divergence is exaggerated by roughly a fvactor of a thousand in FIG. 4.

FIG. 4 also equates the regions A–F with projections of the side-polished region 23 of the fiber 11. However, it is more pertinent to equate the regions A–F with the half-power interaction region. The width of the side-polished region is exaggerated by a factor of about 32, so that the width of the half-power interaction is about 400 times thinner than the width of the illustrated regions A–F. Parenthetically, FIG. 4 shows only about one of every 9000 grating lines.

Considering the exaggeration of divergence and the half-power interaction region together, the degree of parallelism is about 400,000 times greater than indicated in FIG. 4. Thus, the geometry of the grating provides for highly parallel ridge segments in the half-power interaction region, while permitting sufficient divergence for broadband tuning, as detailed below after the following description of the method used to manufacture the illustrated grating 15.

A grating such as grating 15 can fabricated on a fused quartz substrate, which can be one inch square with one surface polished flat. The fused quartz substrate is used for the grating to prevent energy loss of the guided optical signal due to coupling to radiation modes in the substrate. This is accomplished since the refractive index of the fused quartz is lower than the effective index of the guided mode.

A thin film of amorphous silicon can be sputtered onto the polished surface; the film can be about 0.3 $\mu$m thick. Silicon is used for the grating structure since it has a large refractive index and has relatively low absorption losses at the infrared wavelengths, 13,000 to 15,500 Å, of interest. The large index of refraction difference between the amorphous silicon and the fused quartz contributes to an increased reflection coefficient.

Photoresist can then be spun onto the amorphous silicon. The photoresist can be a positive photoresist such as Shipley AZ1350, but other alternative positive and negative photoresists can be accommodated. The photoresist layer can be about 0.4 $\mu$m thick.

Figure 5:
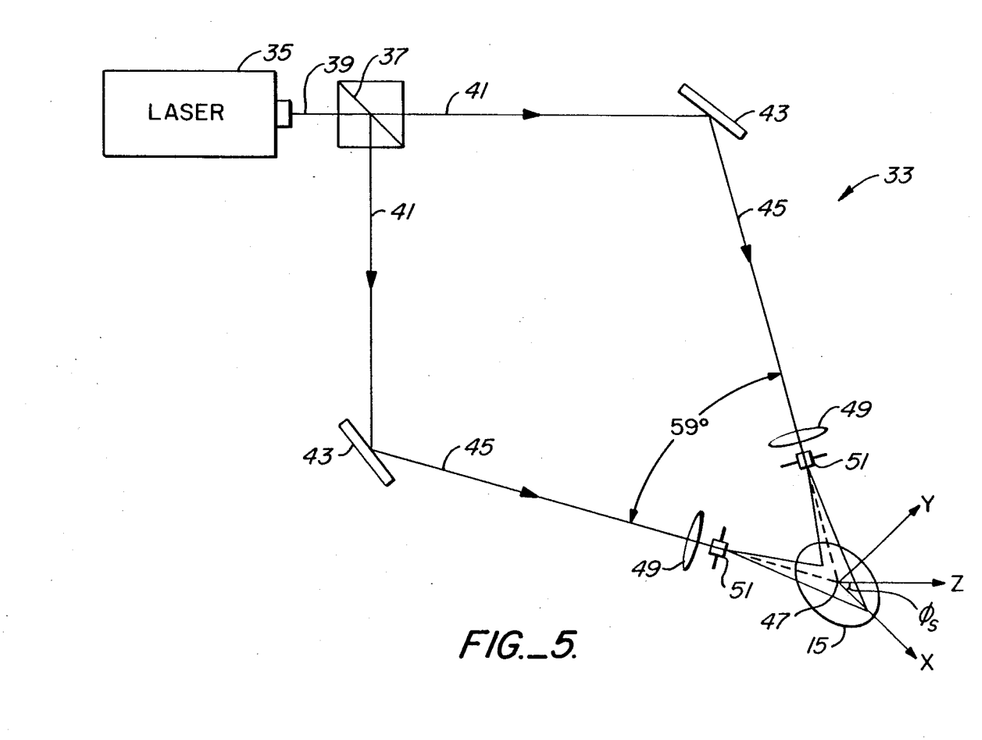
FIG. 5 is a schematic view of an apparatus used in manufacturing a grating for the filter of FIG. 1.

The photoresist coat can then be exposed holographically using a largely conventional apparatus 33 illustrated in FIG. 5. A holographic interference pattern is initiated by a laser source 35, which in the illustrated embodiment is a Helium-Cadmium, HeCd, laser with a nominal wavelength of 4416 Å. A half-silvered mirror 37 is used to split the laser beam 39 into two substantially equal and mutually perpendicular component beams 41.

Respective mirrors 43 are then used to redirect the component beams so that the redirected component beams 45 define a predetermined angle with respect to a point of virtual convergence 47. The point of convergence 47 is virtual in that respective lenses 49 and diffraction pin-holes 51 disturb the redirected component beams 45 before they reach the would-be point of convergence.

The angle of convergence is selected to provide a standing wave interference pattern. The appropriate angle is determined as a function of the laser wavelength as is well-known in the art. In the illustrated embodiment, the 4416 Å wavelength of the HeCd laser 35 requires a 59° angle of convergence to generate the desired holographic interference pattern.

The redirected component beams 45 are focused at their respective pin-holes 51 by respective lenses 49. The pin-holes 51, which in the illustrated apparatus are about 2.5 $\mu$m in diameter, serve as coherent point sources of spherically diverging wavefronts. As is well known, the wavefronts thus created interfere to produce an interference pattern which is sharply defined at the point of virtual convergence 47.

As in the fabrication of a conventional holographic grating, the coated substrate is positioned about the point of convergence 47. However, in accordance with the present invention, the substrate is exposed to a wavefront generated by spherically diverging beams and is tilted about 30° with respect to the wavefront interference plane.

Figure 6:
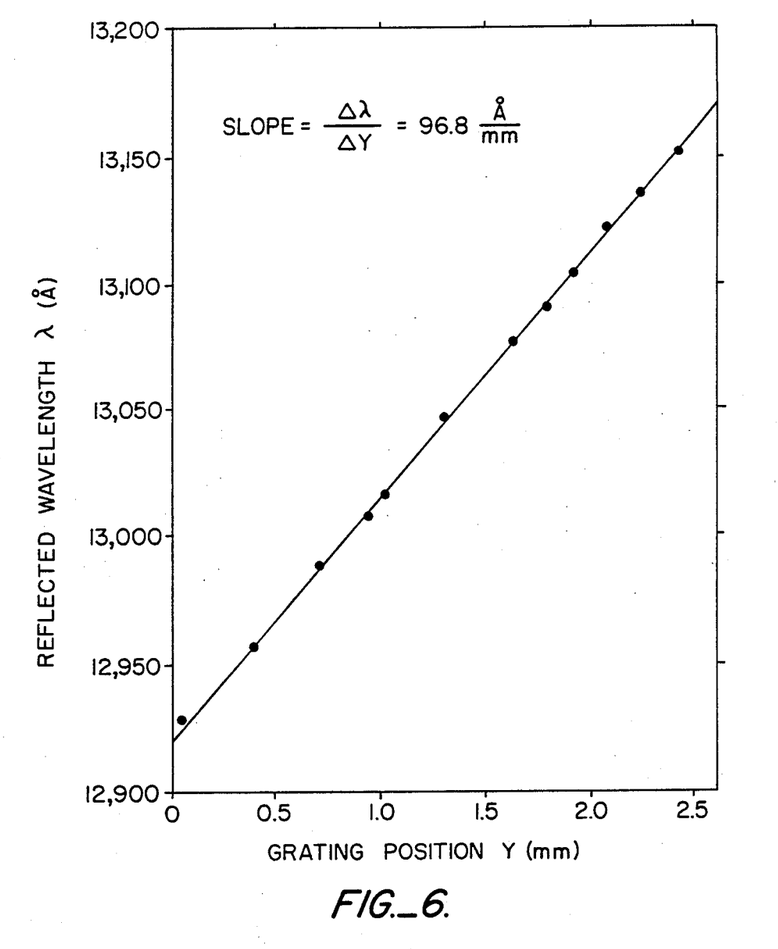
FIG. 6 is a graph depicting reflected wavelength as a function of grating position for the filter of FIG. 1.

To establish a frame of reference, let the point of convergence 47 be an origin, with a line bisecting the 59° angle defining the x-axis; the y-axis is then as illustrated in FIG. 5, and the z-axis is orthogonal to the page. Diverging beams, rather than the conventional collimated beams, are used to generate a diverging interference pattern. The degree of divergence at the substrate can be adjusted by rotating the it from the Yz-plane of the interference front as indicated in FIG. 6.

This tilt causes a lower portion of the substrate to be nearer the pin-holes and an upper portion to be further from the pin-holes. Since the interference pattern diverges away from the pin-holes, a diverging interference pattern is imposed on the photoresist. Those skilled in the art understand that the interference lines are hyperbolic rather than straight. However, straight lines are sufficiently approximated not only over the width of the half-power interactions regions, but also over the tuning range of the grating.

The strips of photoresist exposed to lines of constructive interference are then removed from the substrate by conventional methods. The photoresist pattern is then transferred to the amorphous silicon using a selective reactive ion etch. As gas such as carbon tetrafluoride can be used in the etch. Finally, the remaining photoresist is removed. The resulting grating 15 has a spatial period of approximately 0.45 $\mu$m with a divergence of about 3.4 microradians.

The resulting grating 15 is then mounted on the xyz-translation stage 17, and then placed ridges down onto the side-pOlished optical fiber 11 to allow for evanescent interaction. An index matching oil 53 is preferably applied between fiber 11 and grating 15 to remove any possible air gaps which would reduce the extent of the evanescent field.

The grating 15 is longitudinally centered on the side-polished region 23 of the fiber 11 with its ridges 19 extending substantially transversely of the fiber 11. The x-control 55 of the translation stage 17 is used to center the grating 15 in the x-direction. The z-control 57 of the translation is adjusted to apply sufficient pressure to ensure firm contact between grating 15 and the fiber 11. As indicated above, the y-control 21 is used for tuning.

The block and fiber assembly can be fabricated as provided by Bergh et al., cited above. For completeness, the process is outlined herein. Since, Bergh et al. use two such assemblies to constitute a directional optical coupler, the block and fiber 11 can be referred to collectively as a "coupler half".

The coupler half includes the block 13 and the side-polished fiber 11. The groove 29 is cut or etched into the flat top surface 59 of the block 13 between two end surfaces 61 such that the depth of the groove 29 with respect to the top surface 59 is greater near the two end surfaces 61 that it is midway between the two end surfaces 61. Preferably the depth of the groove 29 varies gradually such that the groove 29 is arcuate between the two end surfaces 61 as shown i n FIG. 3

The fiber 11 is preferably a standard single-mode telecommunications fiber used, for example, for the 13,000 to 15,500 Å wavelengths. The fiber 11 has an inner core 25 and an outer cladding 27. The inner core 25 has a higher refractive index than the outer cladding 27 so that light propagating within the inner core 25 of the optical fiber 11 is guided. The diameter of the core 25 of the illustrated fiber 11 is 10 $\mu$m, while the cladding 27 has a diameter of 125 82 m.

The fiber 11 is placed Within the groove 29 with the axis of the optical fiber 11 extending between the two end surfaces 61. The depth profile of the groove 29 is selected to be greater at the end surfaces 61 than the diameter of the outer cladding 27 of the optical fiber 11. The depth of the groove 29 midway between its ends is selected so that it is approximately equal to the diameter of the outer cladding 27 so that the fiber 11 extends about to the surface of the block 13 at its midpoint.

The optical fiber 11 is held in place in the groove 29 by an epoxy or other suitable adhesive. Thereafter, the top surface 59 of the block 13 and any coplanar portions of the cladding 27 are carefully ground and polished so that a portion of the cladding 27 of the optical fiber 11 is slowly thinned. The grinding and polishing is continued until only a small thickness of the cladding 27 covers the inner core 25 of the optical fiber 11 at the approximate mid-point of the block 13.

For example, given the dimensions of the illustrated optical fiber 11, e g., an inner core 25 with a diameter of 10 $\mu$m and a cladding 27 with a diameter of 125 $\mu$m, a portion of the cladding 27 is thinned until approximately 0.5–5 $\mu$m of the cladding 27 covers the inner core 25 at the longitudinal midpoint of the groove 29. After the grinding and polishing is completed, the region where the cladding has been removed defines the oval side-polished region 23 which is coplanar with the top surface 59 of the quartz block 13.

The performance of the illustrated filter 10 was evaluated by characterizing the spectral distribution of the reflected frequencies. Reflected wavelength is shown as a function of grating position in FIG. 6. The dots indicated the empirical results of measuring reflected wavelengths at different grating positions.

The diagonal line represents a least squares fit, as is known in the art. The proximity of the empirical points to the least squares line indicates a high degree of tuning linearity. Apparently, the hyperbolic nature of the holographic interference pattern does not detract severely from the linearity of the filter. The slope of the diagonal line is 96.8 Å/mm, which corresponds to the 3.4 microradian divergence of the ridges 19.

Figure 7A:
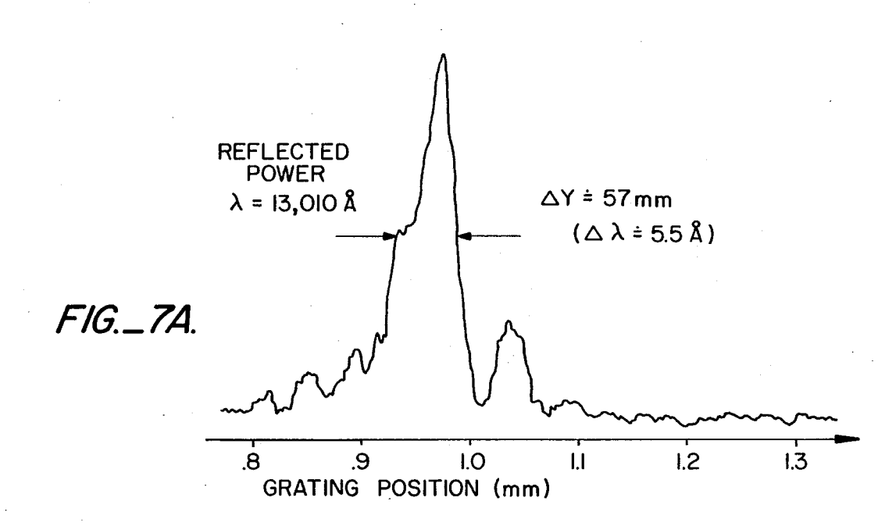
FIGS. 7A, 7B and 7C are graphs showing the spectral distribution of light reflected by the filter of FIG. 1, with the grating of the filter in three respective positions.
Figure 7B:
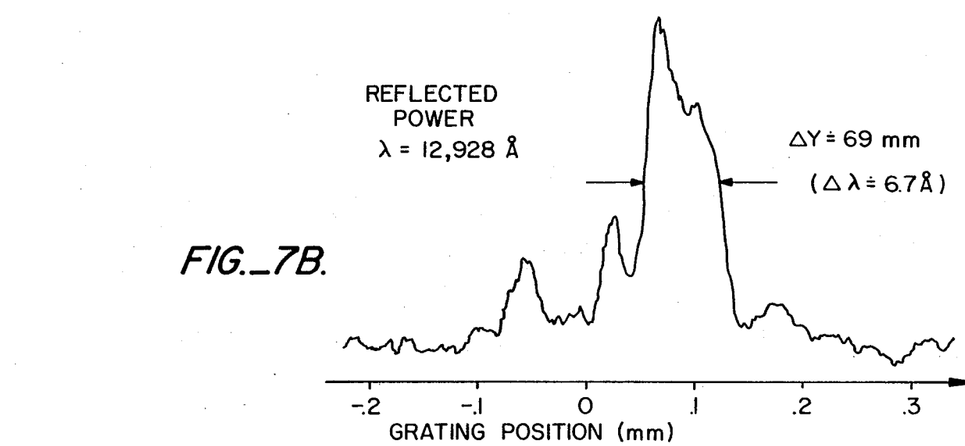
Figure 7C:
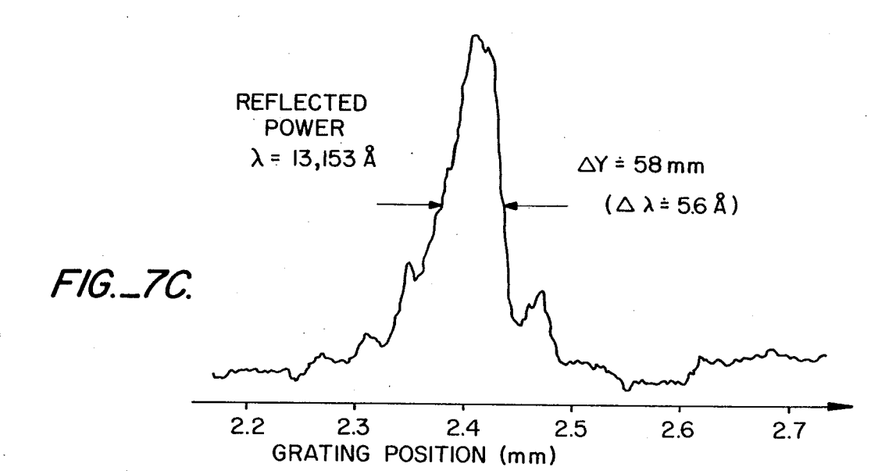

Graphs of power distributions over grating positions taken at different incident wavelengths are shown in FIGS. 7A, 7B and 7C. The illustrated maxima correspond very roughly with regions A, B and C in FIG. 4.

The graph of FIG. 7A was generated using an incident beam with a wavelength of about 13,010 (Å). Maximum power is achieved around a grating position of 1.0 mm along the approximately 2.6 mm effective transverse dimension of the grating 15. The half-power bandwidth of the peak is about 5.6 Å. This corresponds to a 57 $\mu$m translation of the grating 15.

The graph of FIG. 7B was generated using an incident wavelength of about 12,928 Å. Here the reflected power peak occurs at about 0.08 mm along the operating dimension of the grating 15. The half-power bandwidth is about 6.7 Å, corresponding to a 69 $\mu$m movement of the grating 15.

The graph of FIG. 7C was generated using an incident wavelength of about 13,153 Å. The reflected power peak occurs at about 2.4 mm along operating dimension of the grating 15. The half-power bandwidth is about 5.6 Å, corresponding to a 58 μm translation of the grating 15.

Collectively, the three graphs of FIGS. 7A-C indicate a tuning range in excess of 220 Å with a maximum reflected half-power bandwidth of 6.7 Å. This corresponds to a tuning-to-bandwidth ratio of about 33:1. This compares very favorably with the 2:1 or poorer tuning-to-bandwidth ratios provided by the in-fiber filters of the background art discussed above.

In addition to the single-mode fiber, reflective filter embodiment described above, multi-mode fiber transmissive filter embodiments are provided for by the present invention. Multi-mode fibers include single core fibers with cores designed to support multiple transmission modes within a predetermined bandwidth. Alternatively, multiple modes can be provided in a fiber having multiple modes supported by multiple cores, each core supporting a single mode.

Specifically, in a fiber supporting two propagation modes, each with a characteristic velocity, a grating with spatial periodicity equal to the "beat" length for the two modes at a given frequency serves to couple the modes. Thus, a relatively broadband signal along one of the modes can be selectively coupled to the other mode at the grating. The wavelength coupled can be adjusted as above by moving the grating so as to change the spatial periodicity of the grating.

In the case of an optical fiber having two cores with different geometries and/or indexes of refraction so that they support different single modes, a signal input into one core at one end of the fiber can be selectively coupled into the other core at a grating filter. The light withdrawn from the second core at the opposite end of the fiber represents transmissively filtered light. The same filtering can be applied to a multi-mode single core fiber, although the separation of the modes at the fiber output may be more complex.

All of the multi-mode embodiments just discussed are adequately represented by FIGS. 1-4. Of course, $P_R$ must be taken out opposite the end $P_{IN}$ is introduced. In the case of a dual-core fiber, the cores are preferably parallel and transversely disposed with respect to one other, so that each can conveniently interact with the grating.

Figure 8:
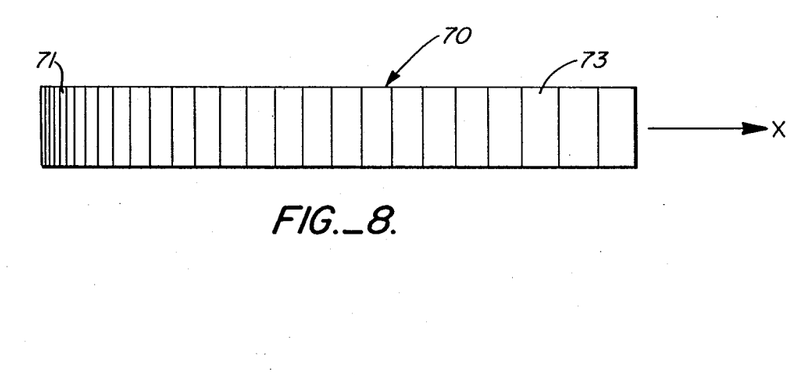
FIG. 8 is a schematic illustration of an alternative grating provided for by the present invention.

While the foregoing represent preferred embodiments, it is understood that many variations and modifications are also provided for by the present invention. For example, a grating 70 with an alternative pattern is indicated in FIG. 8. Here, parallel ridges are arranged on a gradually increasing pitch as a function of longitudinal position with respect to a fiber. For example, the pitch of ridges 71 at one longitudinal end of the grating 70 is less than the pitch of the ridges 73 at the opposite longitudinal end: intermediate series of ridges have intermediate pitches. Thus, the periodicity at a half-power interaction region of the fiber can be controlled by longitudinal translation of the grating 70 along the x-dimension.

There are two basic variations of the embodiment of FIG. 8. In one variation, the periodicity is varied stepwise and the longitudinal translation is performed in discrete steps. Thus, there is nominally no pitch variation over the interaction region.

Alternatively, the pitch can be varied continuously and continuous adjustment provided for by continuous translation. In this case, the pitch must be increased gradually enough so that negligible variation occurs over the region of interaction with the evanescent field.

Many other grating patterns are provided for. Radial gratings can be fabricated with the radial pitch gradually increasing with circumferential position. Such a grating can be rotated about an origin disposed transversely of the interaction region to provide variable periodicity at the evanescent field.

Another grating includes circumferential ridges of radially varying pitch. By rotating such a grating about an off-center point mounted longitudinally of the center of the interaction region, the spatial periodicity at the evanescent field can be controlled.

In addition, different methods of fabrication, wavelengths, fiber geometries and compositions, and methods of accessing the evanescent field are provided for. In particular, the present invention applies to a filter subassembly to be attached to an existing fiber which is then thinned for access to its evanescent field. Alternatively, the filter assembly can include a pre-polished fiber to be spliced into a fiber optic system. These and other variations and modifications are provided for by the present invention, the scope of which is limited only by the following claims.

What is claimed is:

1. A filter for use with optical fibers, said filter comprising:
    a grating including plural elongated regions and plural ridges,
        said elongated regions sharing a common predetermined width, said elongated regions sharing a common predetermined length,
        each region intersecting plural of said ridges to define a series of ridge segments, each series so defined extending lengthwise of the defining region, each ridge segment of each said series extending substantially width-wise across the region,
        each region being characterized by a substantially constant ridge-segment pitch, with a first region having a different pitch from at least a second region;
    coupling means for arranging said grating with respect to an optical fiber so that the evanescent field of light being transmitted through said fiber can substantially interact with said grating, and so that the intersection of said grating and such an evanescent field can be substantially contained within at least one of said regions; and
    positioning means for moving said grating relative to said fiber so that at one position said first region can substantially contain the intersection of said grating and the evanescent field of light being transmitted through said fiber, and so that at another position said second region can substantially contain the intersection of said grating and the evanescent field of light being transmitted through said fiber.

2. The filter of claim 1 further comprising an optical fiber segment coupled to said grating means by said coupling means.

3. The filter of claim 2 wherein said optical fiber supports multiple modes in a given wavelength band, said grating being arranged to interact with the evanescent field of a first transmission mode so as to couple a portion of the energy of said first mode into a second mode supported by said fiber.

4. The filter of claim 3 wherein said grating is arranged so that said coupled portion of energy is propagated along the same direction as the transmission in said first mode.

5. The filter of claim 3 wherein said fiber includes at least two cores, each core being adapted for supporting a respective single mode at a given wavelength band, said modes being characterized by different velocities, said grating being arranged to couple part of the energy propagated in one of said cores to the other of said cores.

6. The filter of claim 1 wherein said coupling means includes one half of a half-wave coupler.

7. The filter of claim 1 wherein at least one of said ridges intersects plural of said regions, the pitch of said ridges of such regions varying as a function of the respective region's position with respect to said intersecting ridge, and wherein said positioning means provides for relative movement of said grating transversely of a fiber coupled thereto by said coupling means.

8. The filter of claim 1 wherein said ridges are arranged substantially in parallel, the pitch of said ridges varying as a monotonic function of ridge sequence, said positioning means providing for longitudinal movement of said grating relative to a longitudinally extending fiber coupled thereto by said coupling means so that the pitch of the ridges in a position to interact with the evanescent field of light being transmitted along said fiber can be varied.

9. The filter of claim 8 wherein said monotonic function is a step function.

10. The filter of claim 8 wherein said monotonic function is a one-to-one mapping.

11. An apparatus for selectively controlling the propagation of light in an optical fiber, said apparatus comprising:
an optical fiber extending between first and second ends and having an inner core and an outer cladding, a portion of said outer cladding being thinned at a location intermediate to the ends of the fiber to form a facing surface thereon through which the evanescent field of light being transmitted along the core of said fiber can emanate;
a grating including gradually diverging ridges which extend substantially transversely to said optical fiber for introducing a variation in refractive index as a periodic function of longitudinal position along said thinned portion of said outer cladding, the periodicity of said grating at said thinned portion being a function of the relative position of said grating and said thinned portion;
coupling means for coupling said grating to said thinned portion so that said grating can interact with the evanescent field of light being transmitted along the core of said fiber; and positioning means for variably positioning said grating relative to said thinned region.

12. The apparatus of claim 11 wherein said optical fiber supports multiple modes in a given wavelength band, said grating being arranged to interact with the evanescent field of a single transmission mode so as to couple a portion of the energy of that single mode into a second mode supported by said fiber.

13. The apparatus of claim 12 wherein said grating is arranged so that said coupled portion of energy is propagated along the same direction as the transmission in said first mode.

14. The apparatus of claim 12 wherein said fiber includes at least two cores, each core being adapted for supporting a respective single mode at a given wavelength band, said modes being characterized by different velocities, said grating being arranged to couple part of the energy propagated in one of said cores to the other of said cores.

15. The apparatus of claim 11 wherein said positioning means includes means for moving said grating transversely with respect to said thinned portion of said fiber to vary the periodicity of perturbation of an evanescent field of light being transmitted along said core.

16. An apparatus for selectively controlling the propagation of light in an optical fiber, said apparatus comprising:
an optical fiber extending between first and second ends and having an inner core and an outer cladding, a portion of said outer cladding being thinned at a location intermediate to the ends of the fiber to form a facing surface thereon through which the evanescent field of light being transmitted along the core of said fiber can emanate, said fiber including first and second cores, said first core supporting a first single mode in a wavelength band and said second core supporting a second single mode in said wavelength band, said first single mode being characterized by a velocity different from the velocity characterizing said second single mode;
periodic refractive perturbation means for introducing a variation in refractive index as a periodic function of longitudinal position along said thinned portion of said outer cladding, the periodicity of said perturbation means at said thinned portion being a function of the relative position of said perturbation means and said thinned portion;
coupling means for coupling said perturbation means to said thinned portion so that said perturbation means can interact with the evanescent field of light being transmitted along the core of said fiber so as to couple part of the energy propagated in said first core to said second core; and
positioning means for variably positioning said perturbation means relative to said thinned region.

* * * * *

UNITED STATES PATENT AND TRADEMARK OFFICE
CERTIFICATE OF CORRECTION

PATENT NO. : 4,986,623
DATED : January 22, 1991
INVENTOR(S) : Wayne V. Sorin

It is certified that error appears in the above-identified patent and that said Letters Patent is hereby corrected as shown below:

Column 2, line 23 "approaCh" should read --approach--; line 53 "limit®d" should read --limited--.

Column 3, line 45 "beams the" should read --beams, the--.

Column 5, line 68 "fvactor" should read --factor--.

Column 7, line 19 "Yz" should read --yz--; line 41 "side-pOlished" should read --side-polished--.

Column 8, line 9 "125 82 m" should read --125 $\mu$m--; line 10 "Within" should read --within--.

Column 9, line 59 "end:" should read --end;--.

Signed and Sealed this

First Day of December, 1992

*Attest:*

DOUGLAS B. COMER

*Attesting Officer*  *Acting Commissioner of Patents and Trademarks*